United States Patent
Tanaka

(10) Patent No.: US 8,428,365 B2
(45) Date of Patent: Apr. 23, 2013

(54) IMAGE PROCESSING APPARATUS, METHOD AND COMPUTER PROGRAM PRODUCT

(75) Inventor: Koichi Tanaka, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 481 days.

(21) Appl. No.: 12/557,823

(22) Filed: Sep. 11, 2009

(65) Prior Publication Data

US 2010/0074531 A1  Mar. 25, 2010

(30) Foreign Application Priority Data

Sep. 24, 2008 (JP) ................... 2008-244017

(51) Int. Cl.
*G06K 9/46* (2006.01)
*G06K 9/00* (2006.01)

(52) U.S. Cl.
USPC ............ 382/201; 382/103; 382/190; 382/192

(58) Field of Classification Search .................. None
See application file for complete search history.

(56) References Cited

U.S. PATENT DOCUMENTS

| | | | |
|---|---|---|---|
| 2003/0095710 A1* | 5/2003 | Tessadro | 382/199 |
| 2007/0031004 A1* | 2/2007 | Matsui et al. | 382/103 |
| 2007/0189599 A1* | 8/2007 | Ryu et al. | 382/154 |
| 2011/0158538 A1* | 6/2011 | Iwamoto et al. | 382/192 |

FOREIGN PATENT DOCUMENTS

JP  5-61975  3/1993

OTHER PUBLICATIONS

C. Tomasi et al., "Detection and tracking of point features", Tech. Rep. CMU-CS-91-132, Apr. 1991.

* cited by examiner

*Primary Examiner* — Jason M Repko
*Assistant Examiner* — Jhere Rowland
(74) *Attorney, Agent, or Firm* — McGinn IP Law Group, PLLC

(57) ABSTRACT

An image processing apparatus includes: an image transformation parameter calculation device which calculates an image transformation parameter for matching an acquired first image and a second image with each other among detected plurality of corresponding points; an image transformation device which transforms the second image using the calculated image transformation parameter and acquires the transformed image as a third image; and a feature point existing region determination device which determines whether or not the feature point extracted from the first image is positioned in an invalid image region at an edge of the image, the invalid image region being generated by execution of a predetermined filtering process on the first image, wherein the corresponding point detection device tracks the feature point determined that the feature point extracted from the first image is positioned in the invalid image region, using the first image and the third image.

11 Claims, 13 Drawing Sheets

(REFERENCE IMAGE)

(REFERENCE IMAGE AND FEATURE POINT)

VALID IMAGE REGION

INVALID IMAGE REGION

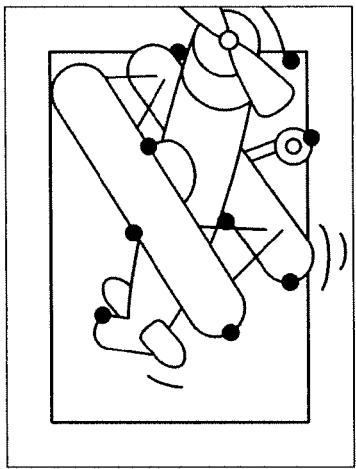
FIG.5A (REFERENCE IMAGE)
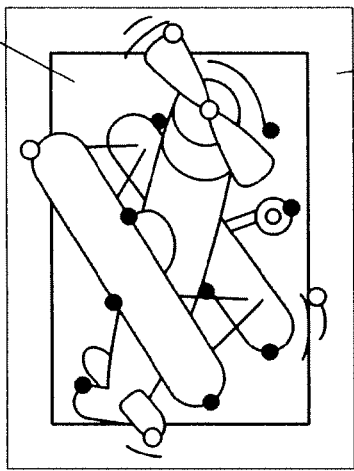
FIG.5B (REFERENCE IMAGE AND FEATURE POINT)
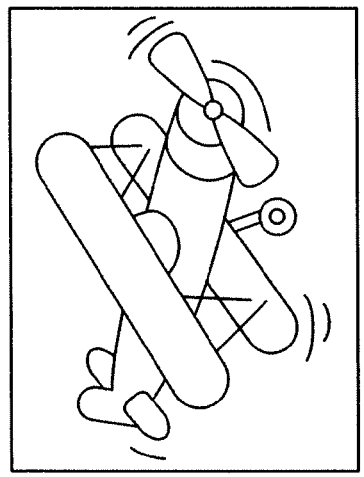
FIG.5C (TRACKING IMAGE AND TRACKING POINT)
VALID IMAGE REGION
INVALID IMAGE REGION FIG.6A
FIG.6B
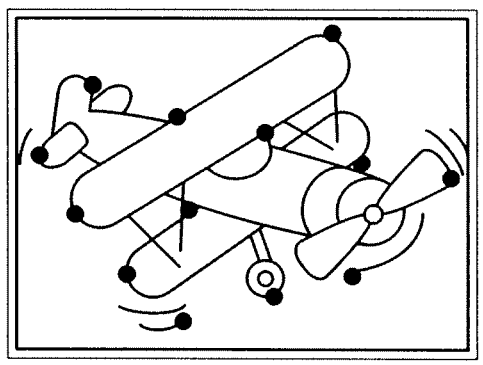
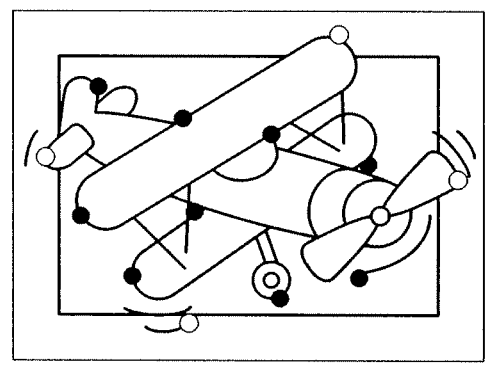

FIG.10A
FEATURE POINT
(X1, Y1)
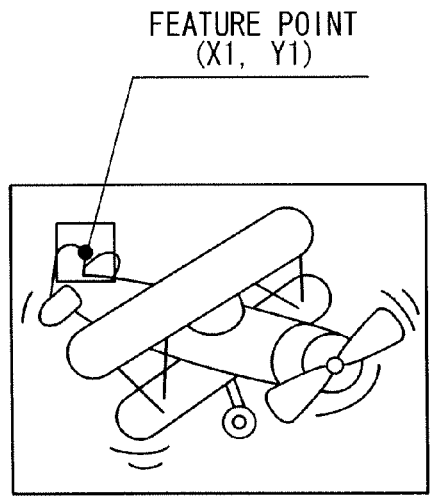
FIG.10B
INITIAL TRACKING POINT
(X2, Y2) = (X1, Y1)
CORRECT TRACKING POINT
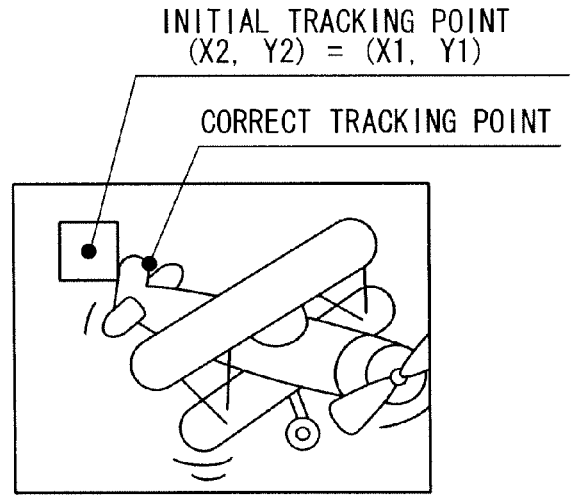
FIG.11
| COORDINATES OF FEATURE POINT | COORDINATES OF TRACKING POINT | MOTION VECTOR OF FEATURE POINT (COORDINATES OF TRACKING POINT − COORDINATES OF FEATURE POINT) |
|---|---|---|
| (10, 10) | (17, 12) | (7, 2) |
| (53, 76) | (60, 78) | (7, 2) |
| (200, 173) | (207, 175) | (7, 2) |
| (321, 89) | (328, 91) | (7, 2) |
| ... | ... | ... |
| ... | ... | ... |
| ... | ... | ... |

REFERENCE IMAGE

TRACKING IMAGE

FIG.13B
TRACKING IMAGE
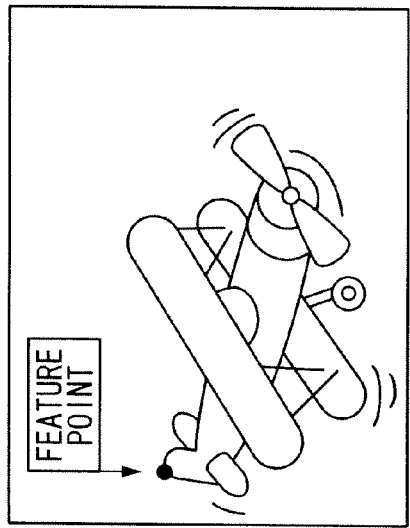 → LPF & THINNING → 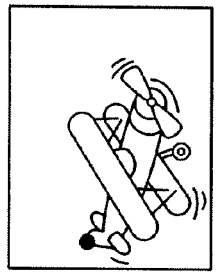 → LPF & THINNING → 
REFLECT TRACKING RESULT TO HIGHER HIERARCHICAL LEVEL
FIG.13A
REFERENCE IMAGE
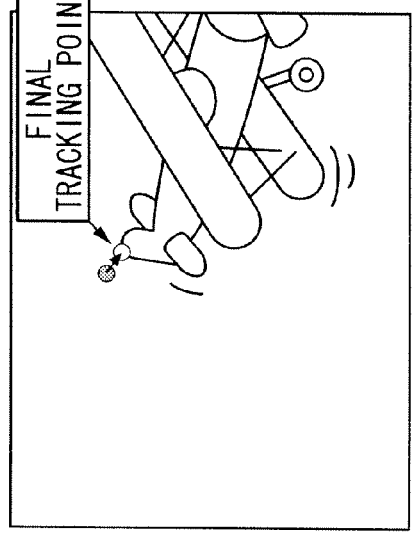 → LPF & THINNING → 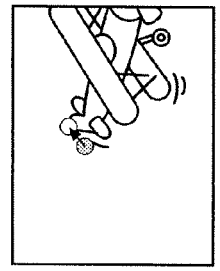 → LPF & THINNING → 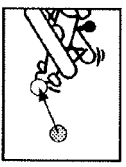

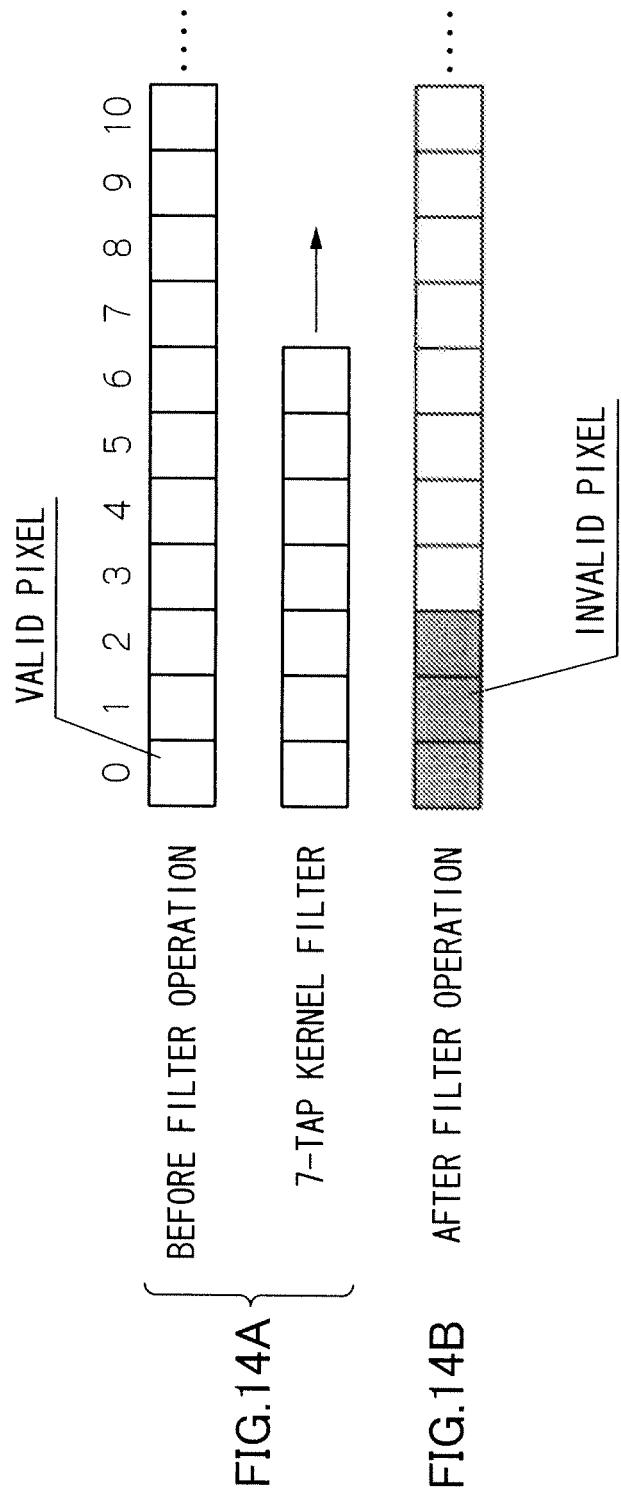

IMAGE PROCESSING APPARATUS, METHOD AND COMPUTER PROGRAM PRODUCT

BACKGROUND OF THE INVENTION

1. Field of the Invention

The present invention relates to an image processing apparatus, method and computer program product, and in particular, relates to a corresponding point detection technique for detecting points (corresponding points) whose features match between a plurality of images.

2. Description of the Related Art

As the technique for detecting corresponding points whose features match between a plurality of images, various methods including KLT method (Tomasi & Kanade, 1991, Detection and Tracking of Point Features) are proposed.

More specifically, as shown in FIGS. 12A and 12B, the method includes a step of inputting two images and extracting a feature point (pixel) from an image (reference image shown in FIG. 12A) to be a reference, and a step of tracking where the feature point is located in the other image (tracking image shown in FIG. 12B) and detecting a point corresponding to the feature point. Here, the point determined as a result of tracking the feature point is referred to as a tracking point. The feature point and tracking point are collectively referred to as corresponding points.

A line segment joining the feature point and the tracking point is referred to as an optical flow (=motion vector) (see FIG. 12B).

There are various methods for tracking a feature point. One of the methods is a gradient method, notably the Lucas-Kanade method. The gradient method acquires a displacement (=motion) between the feature point and the tracking point from gradients (first derivative) of an image signal along the time direction and the space directions.

In general, an advantage of the gradient method is that the processing time is relatively short. On the other hand, a drawback is that the gradient method cannot respond to a large motion. In order to remedy the drawback, a hierarchical gradient method, which individually reduces the two images in stepwise fashion to generate two pyramid hierarchical groups of images and detects a corresponding point by using the hierarchical images as shown in FIG. 13, is proposed (Japanese Patent Application Laid-Open No. 05-61975).

In other words, the hierarchical gradient method tracks the feature point in a low resolution level and then, using the tracking result as an initial value, tracks the point in higher level.

SUMMARY OF THE INVENTION

When the pyramid hierarchical groups of images are used for tracking the feature point as described above, filtering processing by a smoothing filter is executed in the process of generating the hierarchical groups of images. Thus, there is a problem in that a region of invalid pixels (invalid image region) is generated at an edge of the image according to the kernel size of the smoothing filter.

For example, as shown in FIGS. 14A and 14B, if a filtering operation of a seven-tap kernel is executed, the filtering operation cannot be applied to three pixels at the edge (pixels 0, 1 and 2 in FIG. 14A). As a result, the pixels at the edge of the image become invalid pixels.

Thus, the deeper the level of the pyramid hierarchy goes, the larger the size of invalid image region generated by the filtering processing becomes. When, for example, an inputted image is stepwise smoothed and thinned out by ½ in length and width directions and a pyramid hierarchical group of images are generated, an invalid image region having width of X in the nth level (the 0th level indicates the inputted image) becomes an invalid image region of $X*2^n$ in the 0th level.

There is a problem in that the greater the number of pyramid hierarchy is set in order to respond a larger motion between images, the larger the invalid image region where the corresponding point cannot be detected becomes.

The present invention is made in view of these situations. It is an object of the present invention to provide an image processing apparatus, method and computer program product which can track a feature point even when the feature point is in an invalid image region at an edge of an image generated by a filter operation and can detect more corresponding points.

In order to attain the above-mentioned object, a first aspect of the present invention is an image processing apparatus, comprising: an image acquisition device which acquires a first image and a second image; a feature point extraction device which extracts a plurality of feature points from the first image; a corresponding point detection device which detects a plurality of corresponding points by tracking, in the second image, a plurality of points in the second image respectively corresponding to the plurality of feature points extracted from the first image; an image transformation parameter calculation device which calculates an image transformation parameter for matching the first image and the second image with each other among the detected plurality of corresponding points; an image transformation device which transforms the second image using the calculated image transformation parameter and acquires the transformed image as a third image; and a feature point existing region determination device which determines whether or not the feature point extracted from the first image is positioned in an invalid image region at an edge of the image, the invalid image region being generated by execution of a predetermined filtering process on the first image, wherein the corresponding point detection device, when it is determined that the feature point extracted from the first image is positioned in the invalid image region, tracks the determined feature point using the first image and the third image.

According to the first aspect, the feature point existing region determination device determines whether or not the feature point extracted from the first image is positioned in the invalid image region at the edge of the image. The invalid image region is generated by execution of the predetermined filtering process on the first image. When it is not determined that the feature point is positioned in the invalid image region (it is determined that the feature point is positioned in a valid image region), the feature point is tracked in a fashion analogous to the conventional art and the corresponding point is detected.

On the other hand, when it is determined that the feature point is positioned in the invalid image region, the determined feature point is tracked using the first image and the third image. The third image is an image transformed from the second image using the image transformation parameter calculated based on the plurality of corresponding points detected by tracking the feature points positioned in the valid image region. Motion of the third image between images is smaller than that of the first image. Accordingly, the feature point positioned in the invalid image region can be tracked using the first image and the third image. The tracking point in the third image concerning the tracking result can be converted as a point in the second image using the image transformation parameter.

A second aspect of the present invention is an image processing apparatus, comprising: an image acquisition device which acquires a first image and a second image; a feature point extraction device which extracts a plurality of feature points from the first image; a corresponding point detection device which detects a plurality of corresponding points by tracking, in the second image, a plurality of points in the second image respectively corresponding to the plurality of feature points extracted from the first image; a coordinate conversion parameter calculation device which calculates a coordinate conversion parameter indicating a changing amount of the second image with reference to the first image based on the detected plurality of corresponding points; a feature point existing region determination device which determines whether or not the feature point extracted from the first image is positioned in an invalid image region at an edge of the image, the invalid image region being generated by execution of a predetermined filtering process on the first image; and a coordinate conversion device which converts coordinate values of the feature point positioned in the invalid image region in the first image using the calculated coordinate conversion parameter, wherein the corresponding point detection device, when it is determined that the feature point extracted from the first image is positioned in the invalid image region, tracks the determined feature point using a position of the feature point coordinate-converted according to the coordinate conversion parameter as an initial tracking point in the second image.

The second aspect of the present invention is different in the processing when the feature point is determined to be positioned in the invalid image region from the first aspect of the present invention. More specifically, the position of the feature point in the invalid region is coordinate-converted according to the coordinate conversion parameter calculated based on the plurality of corresponding points detected by tracking the feature point positioned in the valid image region. The coordinate-converted feature point is used as the initial tracking point in the second image, and the feature point is tracked. The position of the coordinate-converted feature point (position of the coordinate-converted feature point in the second image) is adjacent to a point (correct tracking point) corresponding to the feature point in the first image, and can favorably be tracked by using the position of the feature point as the initial tracking point.

A third aspect of the present invention is an image processing apparatus according to the first or second aspect, further comprising a hierarchical image generation device which generates a first hierarchical group of images and a second hierarchical group of images including a plurality of images with various resolutions by applying one or a plurality of levels of reduction processing to the first image and the second image, respectively, wherein the hierarchical image generation device applies the predetermined filtering process to an image before the reduction processing.

When image reduction processing by processing of thinning out pixels and the like is executed, the predetermined filtering process is applied to the image before the reduction processing in order not to generate aliasing, and the image after the filtering processing is reduction-processed. As the filtering processing, smoothing processing by a smoothing filter including a low pass filter having a predetermined kernel size is applied.

A fourth aspect of the present invention is an image processing apparatus according to any one of the first to third aspects wherein the corresponding point detection device makes detection the corresponding points in images belonging to the same hierarchical level among the first hierarchical group of images and the second hierarchical group of images, and uses a result of the detection to detect the corresponding points in images belonging to a higher hierarchical level.

A fifth aspect of the present invention is an image processing method, comprising: an image acquisition step of acquiring a first image and a second image; a feature point extraction step of extracting a plurality of feature points from the first image; a feature point existing region determination step of determining whether or not the feature point extracted from the first image is positioned in an invalid image region at an edge of the image, the invalid image region being generated by execution of a predetermined filtering process on the first image; a first corresponding point detection step of detecting a corresponding point in the second image corresponding to the feature point by tracking the corresponding point in the second image when it is not determined that the feature point extracted from the first image is positioned in the invalid image region; an image transformation parameter calculation step of calculating an image transformation parameter for matching the first image and the second image with each other among the plurality of corresponding points detected by the first corresponding point detection step when the processing by the first corresponding point detection step is finished on every feature point not determined to be positioned in the invalid image region; an image transformation step of transforming the second image using the calculated image transformation parameter and acquiring the transformed image as a third image; and a second corresponding point detection step of detecting the corresponding point in the second image corresponding to the feature point determined to be positioned in the invalid image region in the first image, the second corresponding point detection step tracking the feature point using the first image and the third image.

More specifically, when it is not determined that the feature point is positioned in the invalid image region (it is determined that the feature point is positioned in the valid image region), the feature point is tracked in a fashion analogous to the conventional art and the corresponding point is detected. When the processing by the first corresponding point detection step is finished on every feature point determined to be positioned in the valid image region, an image transformation parameter for matching the first image and the second image with each other among the detected plurality of corresponding points is calculated. The third image into which the second image is transformed using the image transformation parameter is created. Then, as for the feature point determined to be positioned in the invalid image region, the corresponding point is subsequently detected by tracking the feature point using the first image and the third image.

A sixth aspect of the present invention is an image processing method, comprising: an image acquisition step of acquiring a first image and a second image; a feature point extraction step of extracting a plurality of feature points from the first image; a feature point existing region determination step of determining whether or not the feature point extracted from the first image is positioned in an invalid image region at an edge of the image, the invalid image region being generated by execution of a predetermined filtering process on the first image; a first corresponding point detection step of detecting a corresponding point in the second image corresponding to the feature point by tracking the corresponding point in the second image when it is not determined that the feature point extracted from the first image is positioned in the invalid image region; a coordinate conversion parameter calculation step of calculating a coordinate conversion parameter indicating a changing amount of the second image with reference to the first image based on the plurality of corresponding points detected by the first corresponding point detection step when the processing by the first corresponding point detection step is finished on every feature point not determined to be positioned in the invalid image region; a coordinate conversion step of converting coordinate values of the feature point determined to be positioned in the invalid image region in the first image using the calculated coordinate conversion parameter; and a second corresponding point detection step of detecting the corresponding point in the second image corresponding to the feature point determined to be positioned in the invalid image region in the first image, the second corresponding point detection step tracking the feature point using a position of the coordinate-converted feature point as an initial tracking point in the second image.

The sixth aspect of the present invention is different in the processing when the feature point is determined to be positioned in the invalid image region from the fifth aspect of the present invention. More specifically, when the processing by the first corresponding point detection step is finished on every feature point determined to be positioned in the valid image region, the position of the feature point positioned in the invalid image region is coordinate-converted according to the coordinate conversion parameter calculated based on the detected plurality of corresponding points. The feature point is tracked using the position of the coordinate-converted feature point as the initial tracking point in the second image.

A seventh aspect of the present invention is an image processing program causing a computer to actualize: an image acquisition capability which acquires a first image and a second image; a feature point extraction capability which extracts a plurality of feature points from the first image; a corresponding point detection capability which detects a plurality of corresponding points by tracking, in the second image, the plurality of corresponding points in the second image respectively corresponding to the plurality of feature points extracted from the first image; an image transformation parameter calculation capability which calculates an image transformation parameter for matching the first image and the second image with each other among the detected plurality of corresponding points; an image transformation capability which transforms the second image using the calculated image transformation parameter and acquires the transformed image as a third image; and a feature point existing region determination capability which determines whether or not the feature point extracted from the first image is positioned in an invalid image region at an edge of the image, the invalid image region being generated by execution of a predetermined filtering process on the first image, wherein the corresponding point detection capability, when it is determined that the feature point extracted from the first image is positioned in the invalid image region, tracks the determined feature point using the first image and the third image.

An eighth aspect of the present invention is an image processing program causing a computer to actualize: an image acquisition capability which acquires a first image and a second image; a feature point extraction capability which extracts a plurality of feature points from the first image; a corresponding point detection capability which detects a plurality of corresponding points by tracking, in the second image, the plurality of corresponding points in the second image respectively corresponding to the plurality of feature points extracted from the first image; a coordinate conversion parameter calculation capability which calculates a coordinate conversion parameter indicating a changing amount of the second image with reference to the first image based on the detected plurality of corresponding points; a feature point existing region determination capability which determines whether or not the feature point extracted from the first image is positioned in an invalid image region at an edge of the image, the invalid image region being generated by execution of a predetermined filtering process on the first image; and a coordinate conversion capability which converts coordinate values of the feature point positioned in the invalid image region in the first image using the calculated coordinate conversion parameter, wherein the corresponding point detection capability, when it is determined that the feature point extracted from the first image is positioned in the invalid image region, tracks the determined feature point using a position of the feature point coordinate-converted according to the coordinate conversion parameter as an initial tracking point in the second image.

According to the present invention, when corresponding points whose features match with each other between images are detected, the feature point positioned even in the invalid image region at the edge of the image generated by the filter operation can be tracked and more corresponding points can be detected.

BRIEF DESCRIPTION OF THE DRAWINGS

FIGS. 5A, 5B and 5C show a relationship between a feature point in a reference image and a tracking point tracked in a tracking image;

FIGS. 6A and 6B show a difference between an invalid image region when using a pyramid hierarchy and that when not using the pyramid hierarchy;

FIGS. 10A and 10B illustrate an initial tracking point when tracking a feature point;

FIG. 11 shows an example of coordinate values of corresponding points (feature point and tracking point) and a motion vector of the feature point;

FIGS. 13A and 13B illustrate a conventional hierarchical gradient method for detecting the corresponding points using two pyramid hierarchical groups of images; and FIGS. 14A and 14B illustrate occurrence of an invalid pixel by a filtering operation.

DETAILED DESCRIPTION OF THE PREFERRED EMBODIMENTS

An image processing apparatus, method and computer program product according to preferred embodiments of the present invention will hereinafter be described with reference to the accompanying drawings.

First Embodiment

Figure 1:
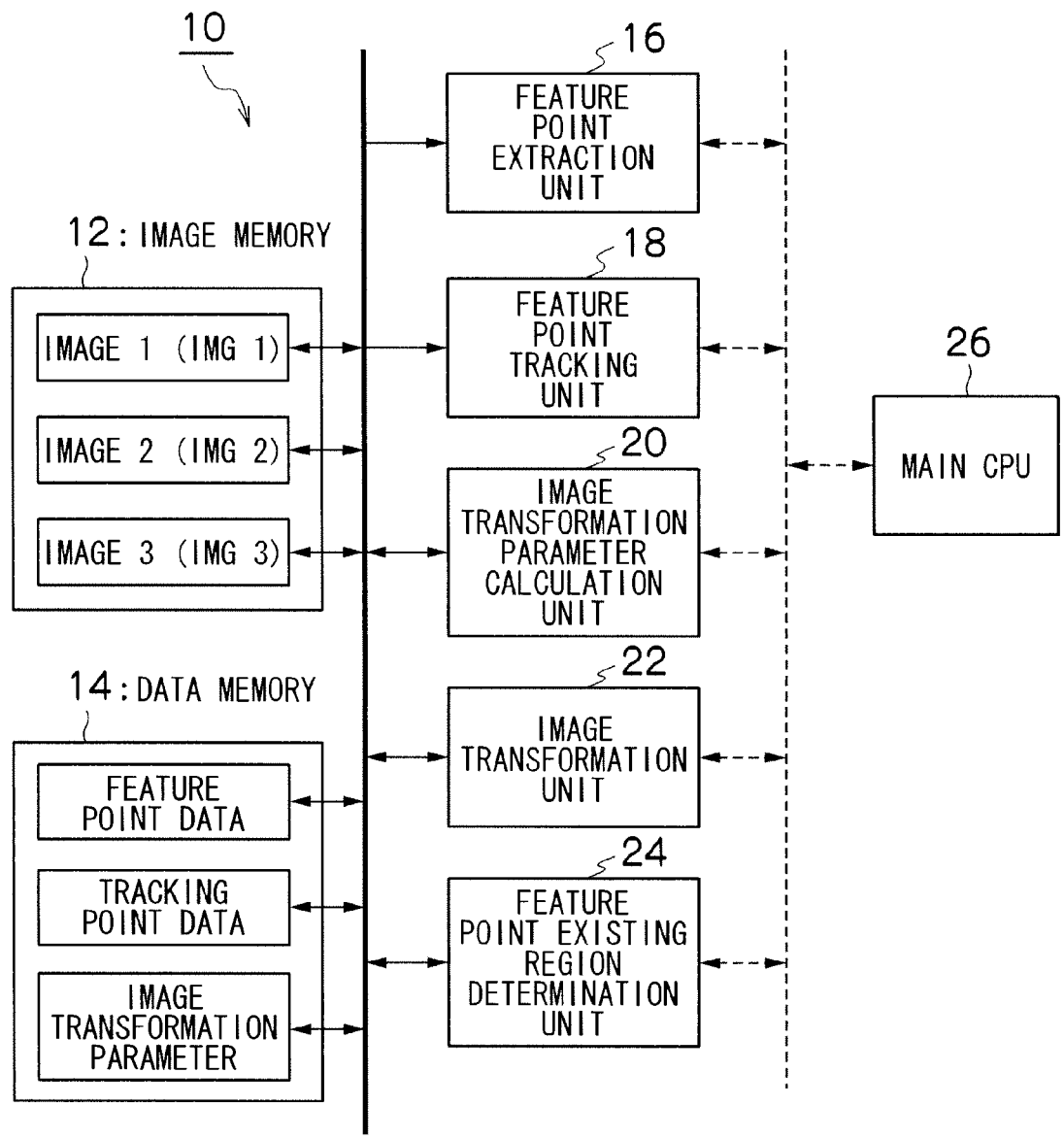
FIG. 1 is a block diagram showing an image processing apparatus according to a first embodiment of the present invention.

FIG. 1 is a block diagram showing an image processing apparatus according to a first embodiment of the present invention.

The image processing apparatus 10 includes an image memory 12, a data memory 14, a feature point extraction unit 16, a feature point tracking unit 18, an image transformation parameter calculation unit 20, an image transformation unit 22, a feature point existing region determination unit 24, and a main CPU (central processing unit) 26.

The main CPU 26 is an integrated controller for controlling each unit of the image processing apparatus 10, and also executing control of input of image data from the image memory 12, output of image data to the image memory 12, and the like.

An image 1 (img1) to be a reference image, an image 2 (img2) to be a tracking image, and an image 3 (img3) to be a transformed image are stored in the image memory 12. The images 1 and 2 are two directly consecutive images in a group of images taken continuously by moving image taking and consecutive image taking. The image 3 is an image transformed from the image 2 generated in an image processing process, which will be described later.

The feature point extraction unit 16 reads the reference image (image 1) from the image memory 12, and extracts a plurality of feature points from the reference image. Feature point data (coordinate values and pixel information etc. in the reference image) indicating the extracted feature points is stored in the data memory 14.

In extraction of a feature point, typically, a point easy to be tracked in subsequent tracking of a feature point is extracted. While various methods including the Harris corner detector, KLT method, Moravec method and SUSAN are proposed, the present invention does not limit the method of extracting a feature point.

The feature point tracking unit 18 includes a pyramid hierarchy generation unit which reads the reference image (image 1) and the tracking image (image 2) from the image memory 12, stepwise applies smoothing by a smoothing filter including a low pass filter and thinning processing to the reference image and tracking image and generates a pyramid hierarchical group of images including a plurality of images with various resolutions; and a corresponding point detection unit which tracks in the tracking image a point corresponding to the feature point in the reference image read from the data memory 14 and detects the corresponding point. The feature point tracking unit 18 stores tracking point data (data including coordinate values in the tracking image) indicating a point (tracking point) on which the tracking succeeds in the data memory 14.

The feature point tracking unit 18 applies a hierarchical gradient method as a method of tracking a feature point. As shown in FIG. 13, the hierarchical gradient method, which is a method of acquiring the displacement of the feature point from gradients of a image signal along the time direction and the space directions, the hierarchical gradient method tracks a feature point in the low resolution level of the group of images pyramid-hierarchized by the pyramid hierarchy generation unit and further executes tracking in a higher resolution level using the tracking result as an initial value.

The image transformation parameter calculation unit 20 reads the feature point data and the tracking point data (data on which tracking has been succeeded) corresponding to the feature point data from the data memory 14, and calculates an image transformation parameter from the coordinate values of the corresponding points (feature point+tracking point).

The image transformation parameter is a parameter which represents a total deviation of the image between the reference image and the tracking image. As an example of the image transformation parameter, a parallel translation parameter, an affine transformation parameter, projective transformation parameter or the like is assumed. The image transformation parameter calculated by the image transformation parameter calculation unit 20 is stored in the data memory 14.

The image transformation unit 22 transforms the tracking image based on the tracking image (image 2) read from the image memory 12 and the image transformation parameter read from the data memory 14, and stores the transformed image (transformed image (image 3)) in the image memory 12. When the image transformation parameter read from the data memory 14 is the affine transformation parameter, the image transformation unit 22 transforms (affine-transforms) the tracking image using the affine transformation parameter and generates the transformed image. The positional deviation between the transformed image (image 3), which is thus generated, and the reference image (image 1) is cancelled and the both images are substantially matched with each other.

The feature point existing region determination unit 24 determines whether the feature point exists in the invalid image region or not based on the coordinate values of the feature point read from the data memory 14 before tracking the feature point. More specifically, threshold processing is executed on the coordinate values (x1, y1) of the feature point. For example, determination is made based on the following conditional expression of an "if" statement.

```
IF (x1 < border_x) OR (x1 > width-border_x-1)
   OR (y1 < border_y) OR (y1 > height-border_y-1)
THEN    the feature point exists in the invalid image region.
ELSE    the feature point exists in the valid image region.
```

The x-coordinate represents a position of a point in width direction (lateral direction) of the image, and the y-coordinate represents the position in height direction of the image. The position of the point is represented as a pixel number of the image. The origin of the xy coordinates is at one of the corner points of the image (for example, the upper left corner point). In the above expression, width (pixel) is the width of the image, and height (pixel) is the height of the image; border_x (pixel) and border_y (pixel) are parameters indicating a border between the invalid image region and the valid image region. The parameters border_x and border_y can preliminarily be calculated based on the kernel size of the smoothing filter and the number of levels of the pyramid hierarchy.

The feature point tracking unit 18 changes the tracking method as described later according to the determination result (whether the feature point exists in the invalid image region or the valid image region) of the feature point existing region determination unit 24.

Figure 2:
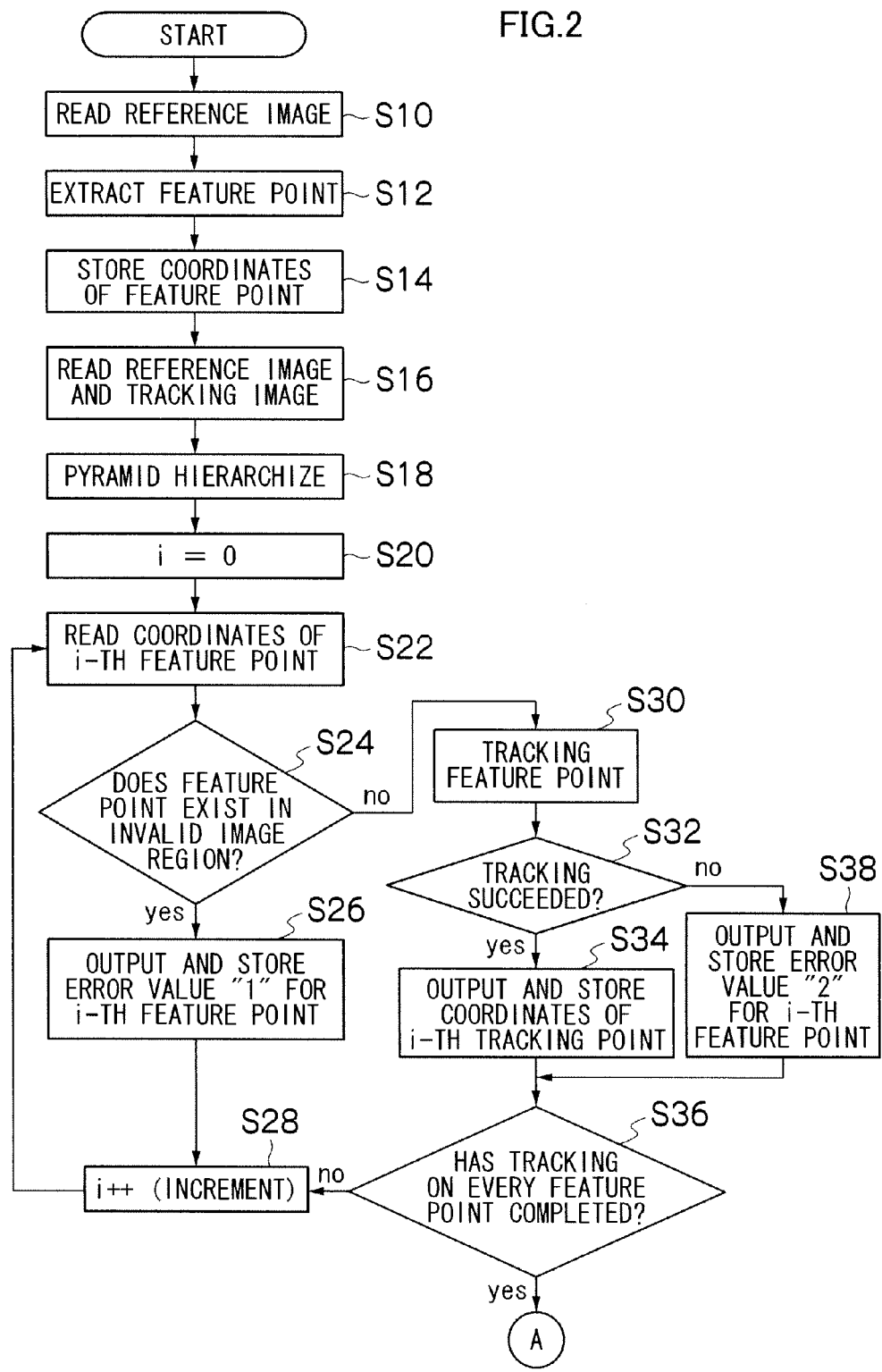
FIG. 2 is a flowchart showing the image processing method according to the first embodiment of the present invention.
Figure 3:
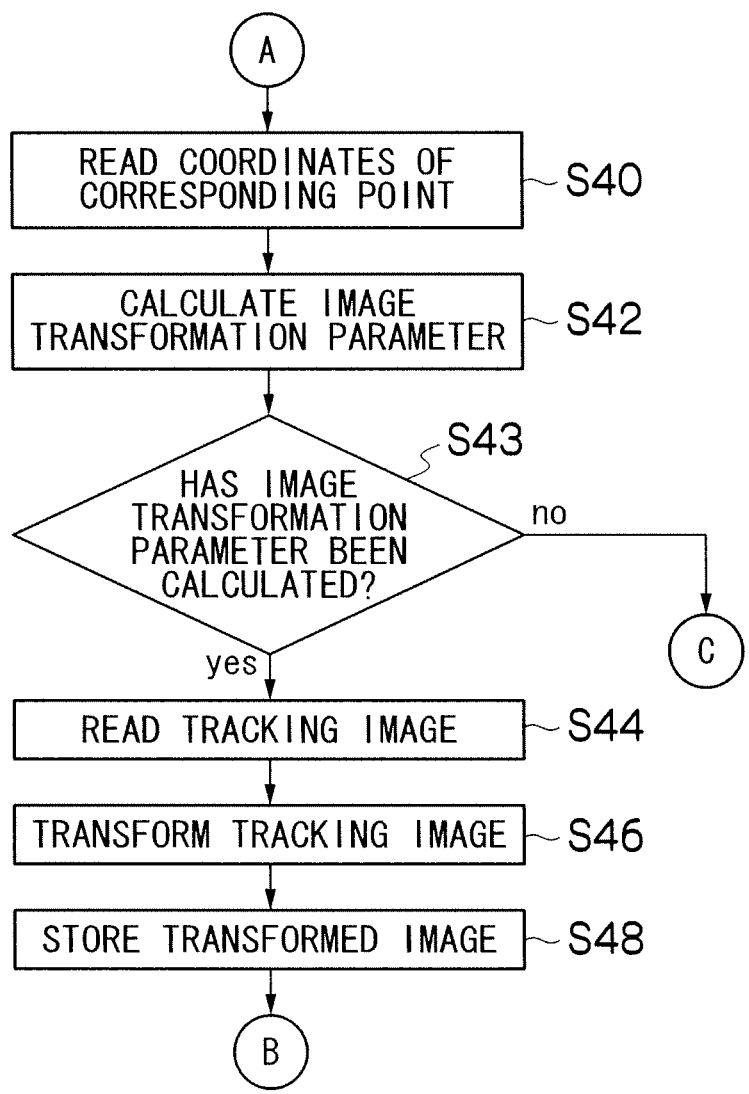
FIG. 3 is a flowchart showing the image processing method according to the first embodiment of the present invention.
Figure 4:
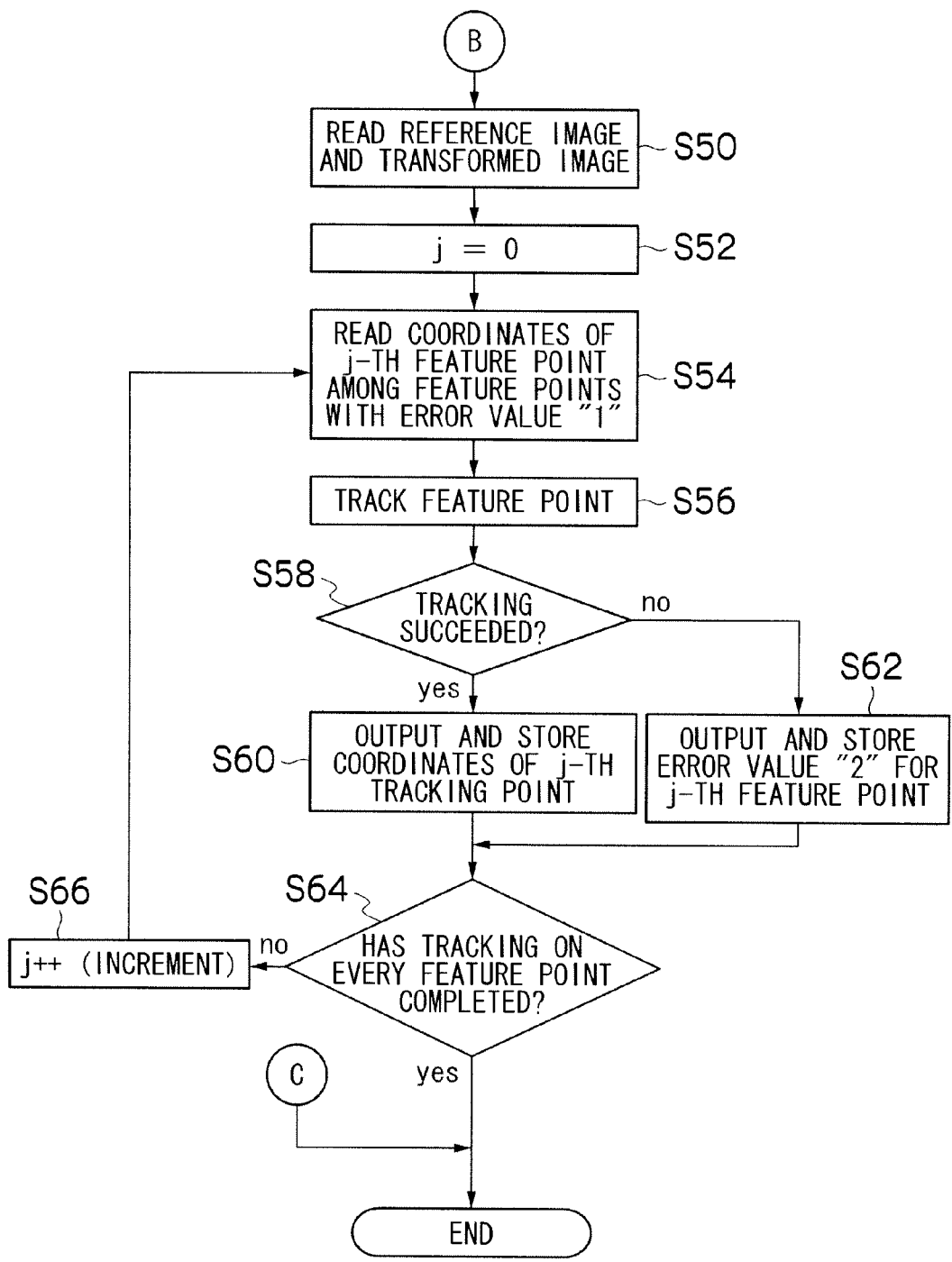
FIG. 4 is a flowchart showing the image processing method according to the first embodiment of the present invention.

FIGS. 2 to 4 are flowcharts showing the image processing method according to the first embodiment of the present invention.

The image processing method according to the first embodiment of the present invention will hereinafter be described according to the flowcharts of FIGS. 2 to 4.

In FIG. 2, the main CPU 26 causes the feature point extraction unit 16 to read the image 1, which has been stored in the image memory 12, as the reference image as shown in FIG. 5A (step S10). The feature point extraction unit 16 extracts the feature point from the read reference image (step S12).

FIG. 5B shows an example of the feature points (points indicated by black dots or white dots) extracted from the reference image.

The feature point data of coordinate values and the like of the extracted feature points is stored in the data memory 14 (step S14). Numbers 0 to n (n=(the number of all feature points)−1) are assigned to the extracted feature points.

The main CPU 26 subsequently causes the feature point tracking unit 18 to read the image 1 (reference image) and the image 2 (tracking image) stored in the image memory 12 (step S14, see FIG. 5A and FIG. 5C). The pyramid hierarchy generation unit in the feature point tracking unit 18 generates the pyramid hierarchical group of images from the reference image and the tracking image (step S18, see FIG. 13).

Next, the main CPU 26 sets a variable i to 0 (step S20), and then causes the feature point existing region determination unit 24 to read the coordinates of the i-th feature point from the data memory 14 (step S22). The feature point existing region determination unit 24 determines whether or not the read feature point exists in the invalid image region (step S24). In FIG. 5B, the feature point indicated by the white dot represents a feature point existing in the invalid image region; the feature point indicated by the black dot represents a feature point existing in a region other than the invalid image region i.e. valid image region.

The feature point existing region determination unit 24, when determining the i-th feature point exists in the invalid image region ("yes"), outputs and stores an error value 1 for the i-th feature point (step S26). The main CPU 26 subsequently increments the variable i by one (step S28), and makes a transition to step S22.

On the other hand, when determining the i-th feature point does not exist in the invalid image region ("no") in step S24, the main CPU 26 causes the feature point tracking unit 18 to track the feature point (step S30). The tracking of the feature point is executed by hierarchical gradient method in which the pyramid hierarchical group of images generated in step S18 is used.

It is determined whether or not the tracking of the feature point has succeeded (step S32). When the tracking is successful (in a case of "yes"), the coordinate values of the tracking point are outputted and stored in association with the i-th feature point (step S34). When the tracking is unsuccessful (in a case of "no"), the error value 2 is outputted and stored for the i-th feature point (step S 38). In FIG. 5C, the tracking points indicated by the black dots represent points on which the tracking has succeeded in the tracking image.

The main CPU 26 subsequently determines whether or not the processing of steps S24 to S38 has been completed on every feature point (step S36). When the processing has not completed (in a case of "no"), the main CPU 26 increments the variable i by one (step S28), and makes a transition to step S22. When the processing has completed (in a case of "yes"), the main CPU 26 makes a transition to step S40 shown in FIG. 3.

According to the above-mentioned processing shown in FIG. 2, the error value 1 is stored for the feature point existing in the invalid image region, and the tracking point or the error value 2 is stored in association with the feature point existing in the valid image region.

In FIG. 3, the main CPU 26 causes the image transformation parameter calculation unit 20 to read the coordinates of a plurality of feature points and tracking points (corresponding points), on which the tracking has been succeeded, among the feature points existing in the valid image region, and to calculate the image transformation parameter based on the coordinates of these corresponding points (steps S40 and S42). It is then determined whether the image transformation parameter has been calculated or not (step S43). When the image transformation parameter is calculated (in a case of "yes"), a transition to step S44 is made. When the image transformation parameter is not calculated (in a case of "no"), the processing is finished (FIG. 4). When, for example, the image transformation parameter is an affine transformation parameter and the number of detected corresponding points is two or less, the image transformation parameter cannot be calculated and the processing is to be finished.

Subsequent to the calculation of the image transformation parameter, the main CPU 26 causes the image transformation unit 22 to read the tracking image (image 2) from the image memory 12 (step S44). The image transformation unit 22 transforms the tracking image using the calculated image transformation parameter (step S46), stores the transformed tracking image (transformed image) as the image 3 (img 3) in the image memory 12 (step S48).

Next, the main CPU 26 causes the feature point tracking unit 18 to read the reference image and the transformed image from the image memory 12 (step S50 in FIG. 4), and to track the feature point existing in the invalid image region as described below.

More specifically, the feature point tracking unit 18 sets the variable j to 0 (step S52), and reads the coordinates of j-th feature point among the feature points on which the error value 1 is stored (step S54). It should be noted that the feature points on which the error value 1 is stored in the step S26 in FIG. 2 are assigned 0, 1, 2, ..., numerals of the feature points on which the error value 1 is stored.

The feature point tracking unit 18 subsequently tracks a point corresponding to the j-th feature point in the transformed image (step S56). The tracking of the feature point is executed, instead of using the pyramid hierarchized group of images, by the gradient method using the 0th level images (image 1 and image 3).

More specifically, the number of levels of the pyramid hierarchy which is used in the first tracking (tracking of the feature point positioned in the valid image region) is made large as much as possible in order to respond the large motion. However, in the second tracking (tracking of the feature point existing in the invalid image region), the situation is that there is substantially no motion between the reference image and the transformed image, thereby obviating the use of the pyramid hierarchized group of images and allowing the tracking in the 0th level image. In the 0th level image, as shown in FIG. 6A, the invalid image region becomes narrower than the pyramid hierarchized image (FIG. 6B), thereby allowing the tracking of the feature point which cannot originally be tracked.

It is subsequently determined whether the tracking of the j-th feature point has succeeded or not (step S58). When the tracking is successful (in a case of "yes"), the coordinate values of the tracking point is outputted and stored in association with the j-th feature point (step S60). When the tracking is unsuccessful (in a case of "no"), the error value 2 is outputted and stored for the j-th feature point (step S62).

Next, the main CPU 26 determines whether or not the processing of steps S54 to S62 have been completed on every feature point on which the error value 1 is stored (step S64). When the processing has not been completed (in a case of "no"), the main CPU 26 increments the variable j by one (step S66), and makes a transition to step S54. When the processing has been completed (in a case of "yes"), the main CPU 26 finishes the processing.

Since the coordinate values of the tracking point stored in step S60 is coordinate values in the transformed image, the image transformation unit 22 converts the values into the coordinate values in the pre-transformed tracking image using the image transformation parameter, and newly stores the converted value. It should be noted that the converted coordinate values may be stored when the feature point tracking unit 18 stores the coordinate values of the tracking point in the data memory 14.

According to the first embodiment, on the feature point existing in the invalid image region which expands because the levels of the pyramid hierarchy are increased in order to respond the large motion, the tracking is made using the transformed image. This allows the tracking of the feature point which has originally existed in the invalid image region, resulting in that the corresponding point can be detected in an a really dense fashion.

Second Embodiment

Figure 7:
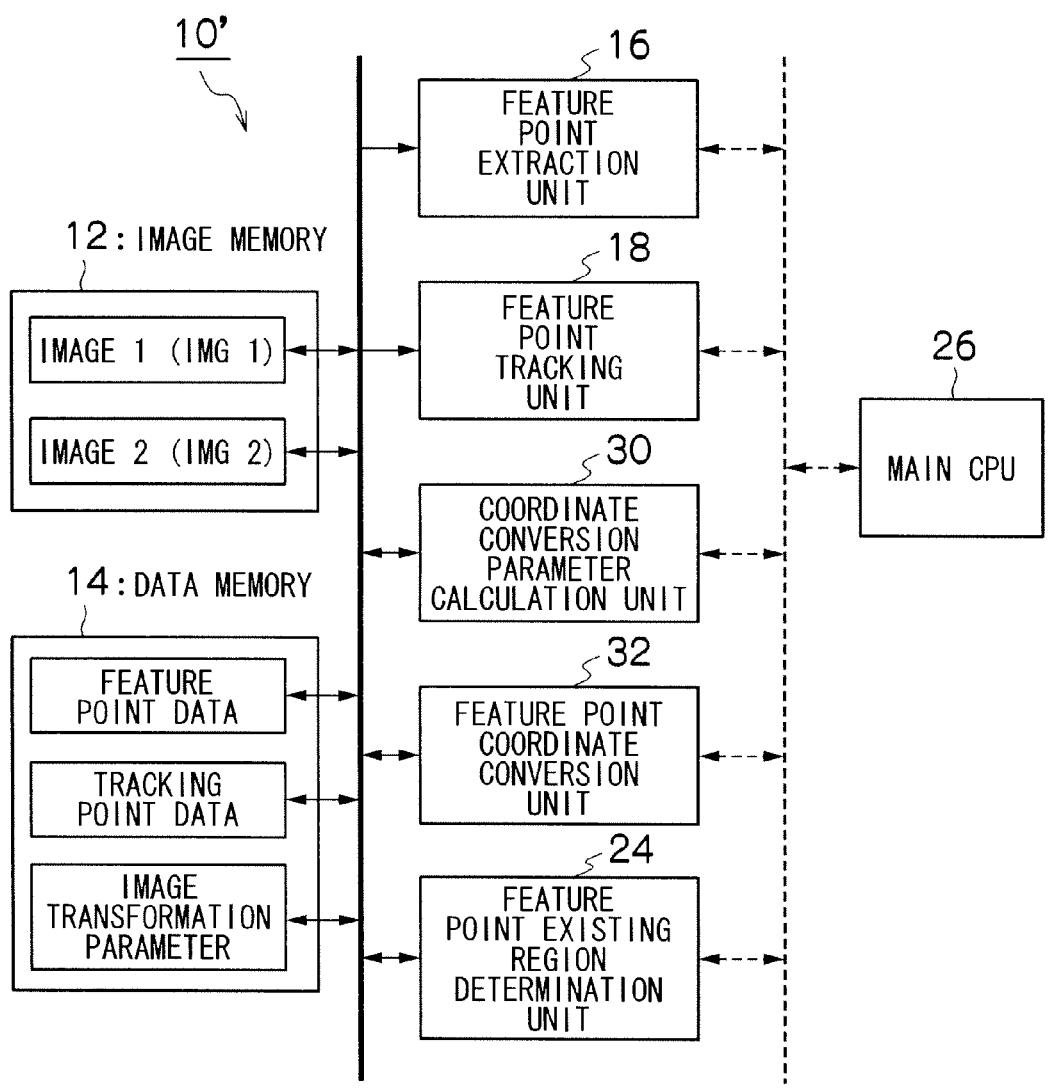
FIG. 7 is a block diagram showing an image processing apparatus according to a second embodiment of the present invention.

FIG. 7 is a block diagram showing an image processing apparatus according to a second embodiment of the present invention. Elements common to those shown in FIG. 1 will be denoted by the identical reference symbols, and the description thereof will be omitted.

An image processing apparatus 10' according to the second embodiment is mainly different in that the image processing apparatus 10' includes a coordinate conversion parameter calculation unit 30 and a feature point coordinate conversion unit 32 instead of the image transformation parameter calculation unit 20 and the image transformation unit 22 of the image processing apparatus 10 according to the first embodiment shown in FIG. 1.

In general, when the feature point is tracked by the gradient method, it is necessary to determine an initial value of the tracking point. Typically, the identical position to the feature point (x1, y1) in the reference image shown in FIG. 10A is determined as an initial tracking point (x2, y2) in the tracking image shown in FIG. 10B. A correct tracking point is then derived using image information around an adjacent region of the feature point and image information around an adjacent region of the initial tracking point.

However, when the correct tracking point and the initial tracking point largely deviate from each other as shown in FIGS. 10A and 10B, it is difficult to derive the correct tracking point because there are no correlation between image information around the feature point and that around the initial tracking point. Accordingly, it is preferable to set such that the initial tracking point is positioned in the vicinity of the correct tracking point.

The second embodiment allows tracking of the feature point existing in the invalid image region by correctly setting the initial tracking point.

In FIG. 7, the coordinate conversion parameter calculation unit 30 calculates a coordinate conversion parameter based on coordinate values of the corresponding points (feature point+ tracking point) detected in the valid image region. This coordinate conversion parameter corresponds to the image transformation parameter in the first embodiment, and is a parameter representing a total deviation of the image between the reference image and the tracking image. For example, a parallel translation parameter, an affine transformation parameter, a projective transformation parameter or the like is assumed. The coordinate conversion parameter calculated by the coordinate conversion parameter calculation unit 30 is stored in the data memory 14.

Now it is assumed that the corresponding point is detected in the valid image region as shown in FIG. 11. If the coordinate conversion parameter is a parallel translation parameter, a parallel translation amount of 7 in the x direction and 2 in the y direction can be derived from an average value of a motion vector (tracking point coordinates−feature point coordinates) of the feature points. This indicates that a positional deviation of 7 in the x direction and 2 in the y direction has occurred.

The feature point coordinate conversion unit 32 coordinate-converts the coordinate values of the feature point read from the data memory 14 based on the coordinate conversion parameter read from the data memory 14, and passes the coordinate-converted coordinate values of the feature point as a position of the initial tracking point in the tracking image to the feature point tracking unit 18.

The feature point tracking unit 18, while tracking the feature point in the valid image region in an analogous fashion to the first embodiment, executes tracking of the feature point existing in the invalid image region in a manner to track the feature point in the tracking image using the position of the initial tracking point passed by the feature point coordinate conversion unit 32.

The image processing method according to the second embodiment of the present invention will hereinafter be described according to the flowcharts of FIGS. 8 and 9.

Figure 8:
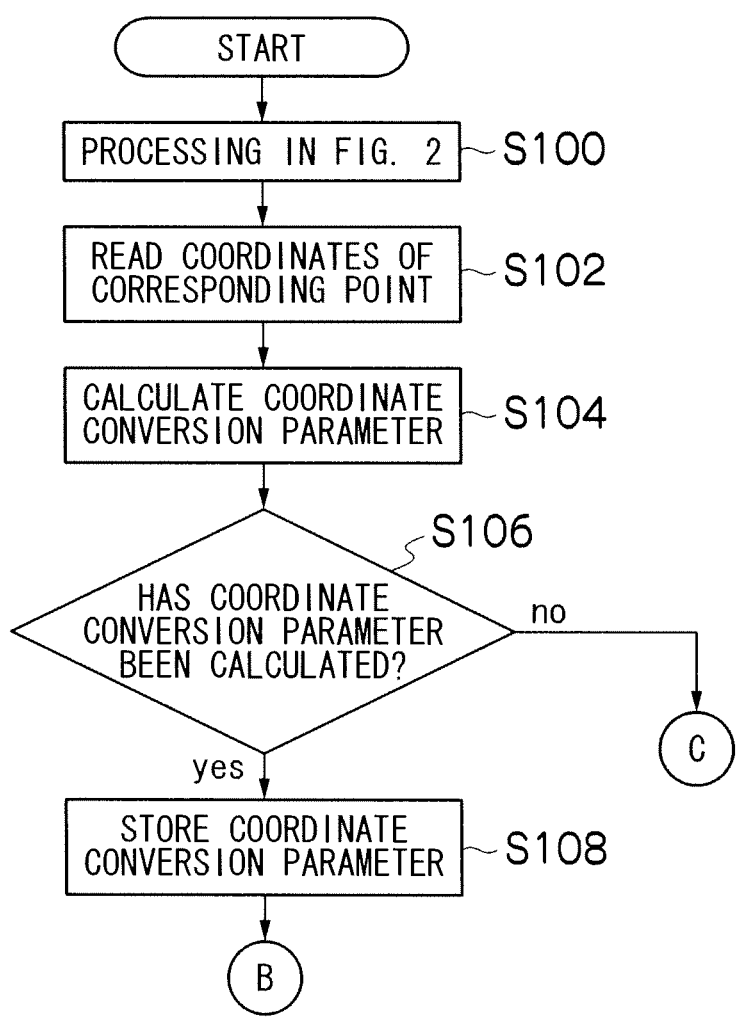
FIG. 8 is a flowchart showing an image processing method according to the second embodiment of the present invention.

In FIG. 8, processing identical to that shown in FIG. 2 is executed for the first tracking (tracking of the feature point positioned in the valid image region) and the like (step S100).

Next, the main CPU 26 causes the coordinate conversion parameter calculation unit 30 to read the coordinates of a plurality of feature points and tracking point (corresponding points), on which the tracking has been succeeded, among the feature points existing in the valid image region, and to calculate the coordinate conversion parameter based on the coordinates of these corresponding points (steps S102 and S104). It is then determined whether the coordinate conversion parameter is calculated or not (step S106). When the coordinate conversion parameter is calculated (in a case of "yes"), a transition to step S108 is made and the coordinate conversion parameter is stored in the data memory 14. When the coordinate conversion parameter is not calculated (in a case of "no"), the processing is finished (FIG. 9).

Next, the main CPU 26 causes the feature point tracking unit 18 to read the reference image and the transformed image from the image memory 12 (step S10 in FIG. 9), and to execute a second tracking (tracking of the feature point positioned in the invalid image region).

Figure 9:
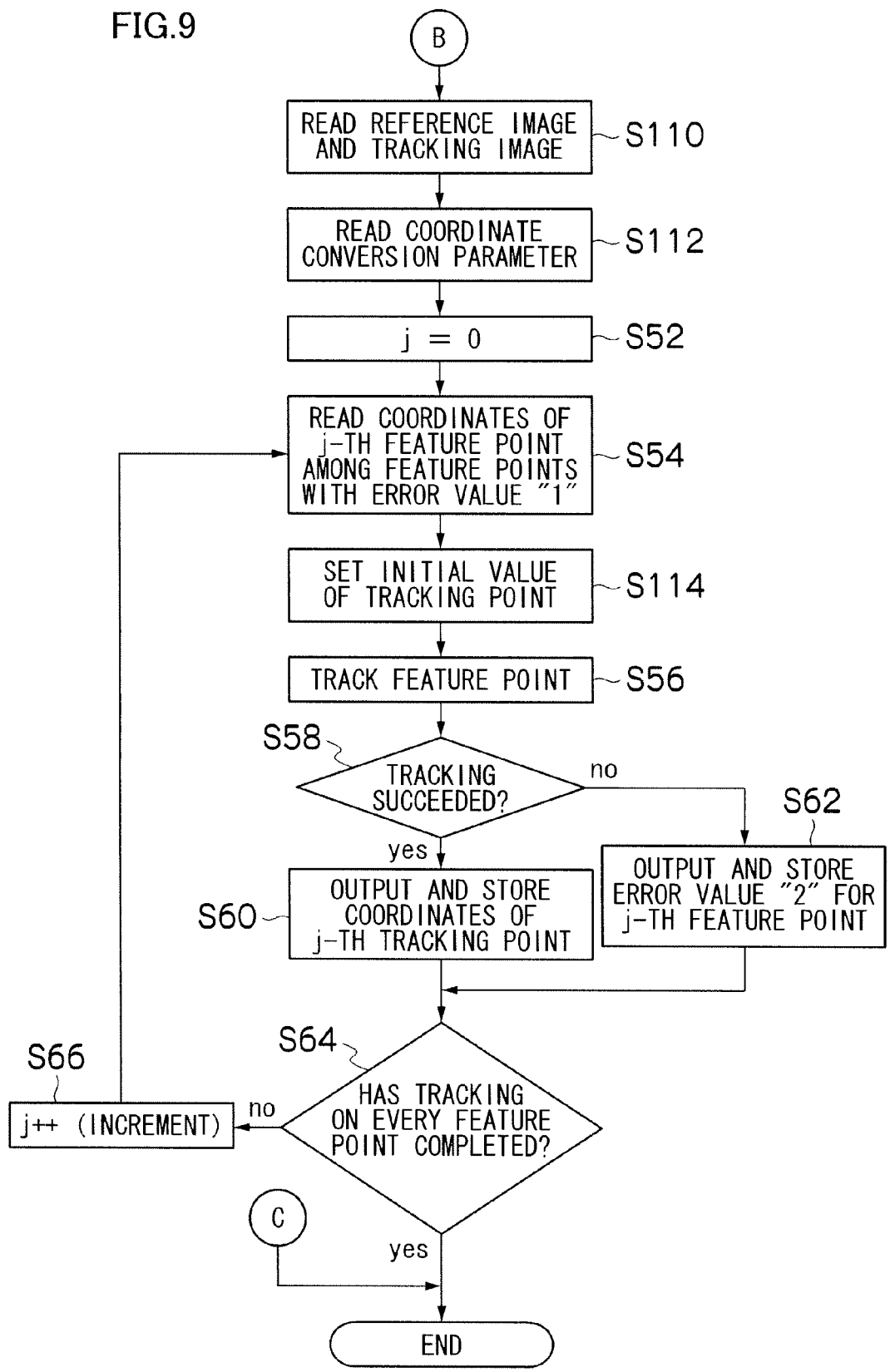
FIG. 9 is a flowchart showing the image processing method according to the second embodiment of the present invention.
Figure 12A:
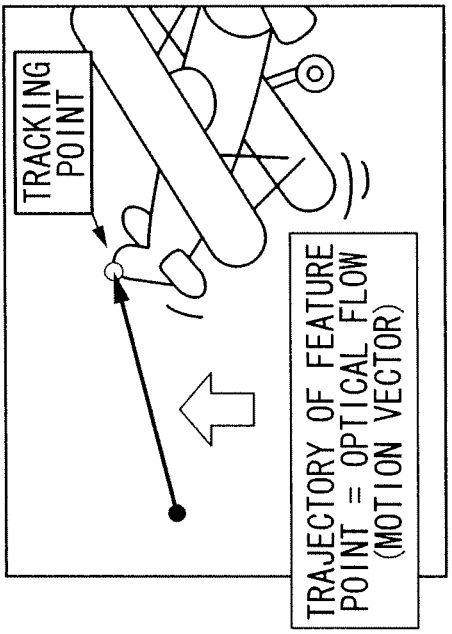
FIGS. 12A and 12B illustrate a conventional art for detecting corresponding points whose features are identical to each other from two images (reference image and tracking image)
Figure 12B:
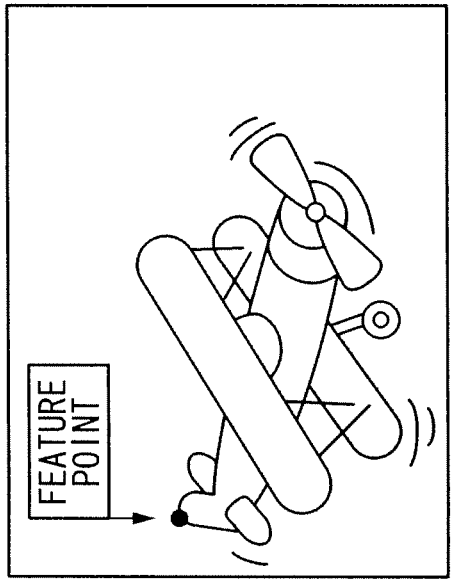

In FIG. 9, steps common to those of the first embodiment shown in FIG. 4 will be denoted by the identical step numerals, respectively, and the description thereof will be omitted.

On the second tracking, the first embodiment causes the feature point tracking unit 18 to read the reference image and the transformed image from the image memory 12 (step S50 in FIG. 4). The second embodiment is different in that the feature point tracking unit 18 reads the reference image and the transformed image in the manner as described above.

Furthermore, in the second embodiment, steps S112 and S114 are added to the flowchart shown in FIG. 4.

In step S112, the feature point coordinate conversion unit 32 reads the coordinate conversion parameter from the data memory 14. In step S114, the coordinates of the feature point read in step S54 are coordinate-converted based on the coordinate conversion parameter read in step S112, and the coordinate-converted coordinate values are set as the position of the initial tracking point.

The feature point tracking unit 18 tracks the feature point using the initial tracking point set in step S114 as the starting point of the tracking (step S56).

According to the second embodiment, on the feature point existing in the invalid image region which expands because the levels of the pyramid hierarchy are increased in order to respond the large motion, coordinate conversion is made in order to bring the initial tracking point close to the correct tracking point and then the tracking is start from the coordinate-converted initial tracking point. This allows the tracking of the feature point which has originally existed in the invalid image region, resulting in that the corresponding point can be detected in an a really dense fashion.

[Addendum]

The image processing according to the present invention is not limited to a case where the processing is executed on dedicated hardware. Instead, the processing may be actualized by a personal computer.

It is needless to say that the present invention is not limited to the above-mentioned embodiments and various changes can be made without departing the spirit of the present invention.

What is claimed is:

1. An image processing apparatus, comprising:
   an image receiver which acquires a first image and a second image;
   a feature point extractor which extracts a plurality of feature points from the first image;
   a corresponding point detector which detects a plurality of corresponding points by tracking, in the second image, a plurality of points in the second image respectively corresponding to the plurality of feature points extracted from the first image;
   an image transformation parameter calculator which calculates an image transformation parameter for matching the first image and the second image with each other among the detected plurality of corresponding points;
   an image transformer which transforms the second image using the calculated image transformation parameter and acquires the transformed image as a third image; and
   a feature point existing region detector which determines whether or not the feature point extracted from the first image is positioned in an invalid image region at a circumference of the image, the invalid image region which is a region of invalid pixels being generated by execution of a predetermined filtering process on the first image,
   wherein the corresponding point detector, when it is determined that the feature point extracted from the first image is positioned in the invalid image region, tracks the determined feature point using the first image and the third image.

2. An image processing apparatus, comprising:
   an image receiver which acquires a first image and a second image;
   a feature point extractor which extracts a plurality of feature points from the first image;
   a corresponding point detector which detects a plurality of corresponding points by tracking, in the second image, a plurality of points in the second image respectively corresponding to the plurality of feature points extracted from the first image;
   a coordinate conversion parameter calculator which calculates a coordinate conversion parameter indicating a changing amount of the second image with reference to the first image based on the detected plurality of corresponding points;
   a feature point existing region detector which determines whether or not the feature point extracted from the first image is positioned in an invalid image region at a circumference of the image, the invalid image region which is a region of invalid pixels being generated by execution of a predetermined filtering process on the first image; and
   a coordinate converter which converts coordinate values of the feature point positioned in the invalid image region in the first image using the calculated coordinate conversion parameter, wherein
   the corresponding point detector, when it is determined that the feature point extracted from the first image is positioned in the invalid image region, tracks the determined feature point using a position of the feature point coordinate-converted according to the coordinate conversion parameter as an initial tracking point in the second image.

3. The image processing apparatus according to claim 1, further comprising a hierarchical image generator which generates a first hierarchical group of images and a second hierarchical group of images including a plurality of images with various resolutions by applying one or a plurality of levels of reduction processing to the first image and the second image, respectively,
   wherein the hierarchical image generator applies the predetermined filtering process to an image before the reduction processing.

4. The image processing apparatus according to claim 1, wherein the corresponding point detector makes detection the corresponding points in images belonging to the same hierarchical level among the first hierarchical group of images and the second hierarchical group of images, and uses a result of the detection to detect the corresponding points in images belonging to a higher hierarchical level.

5. An image processing method, comprising:
   an image acquisition step of acquiring a first image and a second image;
   a feature point extraction step of extracting a plurality of feature points from the first image;
   a feature point existing region determination step of determining whether or not the feature point extracted from the first image is positioned in an invalid image region at a circumference of the image, the invalid image region which is a region of invalid pixels being generated by execution of a predetermined filtering process on the first image;
   a first corresponding point detection step of detecting a corresponding point in the second image corresponding to the feature point by tracking the corresponding point in the second image when it is not determined that the feature point extracted from the first image is positioned in the invalid image region;
   an image transformation parameter calculation step of calculating an image transformation parameter for matching the first image and the second image with each other among the plurality of corresponding points detected by the first corresponding point detection step when the processing by the first corresponding point detection step is finished on every feature point not determined to be positioned in the invalid image region;
   an image transformation step of transforming the second image using the calculated image transformation parameter and acquiring the transformed image as a third image; and
   a second corresponding point detection step of detecting the corresponding point in the second image corresponding to the feature point determined to be positioned in the invalid image region in the first image, the second corresponding point detection step tracking the feature point using the first image and the third image.

6. An image processing method, comprising:

an image acquisition step of acquiring a first image and a second image;

a feature point extraction step of extracting a plurality of feature points from the first image;

a feature point existing region determination step of determining whether or not the feature point extracted from the first image is positioned in an invalid image region at a circumference of the image, the invalid image region which is a region of invalid pixels being generated by execution of a predetermined filtering process on the first image;

a first corresponding point detection step of detecting a corresponding point in the second image corresponding to the feature point by tracking the corresponding point in the second image when it is not determined that the feature point extracted from the first image is positioned in the invalid image region;

a coordinate conversion parameter calculation step of calculating a coordinate conversion parameter indicating a changing amount of the second image with reference to the first image based on the plurality of corresponding points detected by the first corresponding point detection step when the processing by the first corresponding point detection step is finished on every feature point not determined to be positioned in the invalid image region;

a coordinate conversion step of converting coordinate values of the feature point determined to be positioned in the invalid image region in the first image using the calculated coordinate conversion parameter; and a second corresponding point detection step of detecting the corresponding point in the second image corresponding to the feature point determined to be positioned in the invalid image region in the first image, the second corresponding point detection step tracking the feature point using a position of the coordinate-converted feature point as an initial tracking point in the second image.

7. A computer program product for image processing, comprising:

a non-transitory computer readable storage medium having computer readable program code embodied therein, the computer readable program code comprising:

computer-readable program code for causing a computer to acquire a first image and a second image;

computer-readable program code for causing the computer to extract a plurality of feature points from the first image;

computer-readable program code for causing the computer to detect a plurality of corresponding points by tracking, in the second image, the plurality of corresponding points in the second image respectively corresponding to the plurality of feature points extracted from the first image;

computer-readable program code for causing the computer to calculate an image transformation parameter for matching the first image and the second image with each other among the detected plurality of corresponding points;

computer-readable program code for causing the computer to transform the second image using the calculated image transformation parameter and acquires the transformed image as a third image;

computer-readable program code for causing the computer to determine whether or not the feature point extracted from the first image is positioned in an invalid image region at a circumference of the image, the invalid image region which is a region of invalid pixels being generated by execution, of a predetermined filtering process on the first image; and computer-readable program code for causing the computer to track the determined feature point using the first image and the third image the corresponding point detection capability when it is determined that the feature point extracted from the first image is positioned in the invalid image region.

8. A computer program product for image processing, comprising:

a non-transitory computer readable storage medium having computer readable program code embodied therein, the computer readable program code comprising:

computer-readable program code for causing a computer to acquire a first image and a second image;

computer-readable program code for causing the computer to extract a plurality of feature points from the first image;

computer-readable program code for causing the computer to detect a plurality of corresponding points by tracking, in the second image, the plurality of corresponding points in the second image respectively corresponding to the plurality of feature points extracted from the first image;

computer-readable program code for causing the computer to calculate a coordinate conversion parameter indicating a changing amount of the second image with reference to the first image based on the detected plurality of corresponding points;

computer-readable program code for causing the computer to determine whether or not the feature point extracted from the first image is positioned in an invalid image region at a circumference of the image, the invalid image region which is a region of invalid pixels being generated by execution of a predetermined filtering process on the first image;

computer-readable program code for causing the computer to convert coordinate values of the feature point positioned in the invalid image region in the first image using the calculated coordinate conversion parameter; and computer-readable program code for causing the computer to track the determined feature point using a position of the feature point coordinate-converted according to the coordinate conversion parameter as an initial tracking point in the second image when it is determined that the feature point extracted from the first image is positioned in the invalid image region.

9. The image processing apparatus according to claim 1, wherein the invalid image region comprises the invalid pixels which are generated at the circumference of the first image according to a kernel size of the predetermined filtering process.

10. The image processing apparatus according to claim 1, wherein the invalid pixels comprise pixels which exist inward from the circumference of the first image by a pixel count less than the kernel size of the predetermined filtering process.

11. The image processing apparatus according to claim 1, wherein a size of the invalid image region changes according to a level in a hierarchical gradient method for tracking the feature point.

* * * * *